United States Patent [19]

Beeghly et al.

[11] 4,181,883

[45] Jan. 1, 1980

[54] HOURMETER-TACHOMETER

[75] Inventors: Bruce R. Beeghly; Joseph Lepley, both of Youngstown, Ohio

[73] Assignee: The Economy Engine Company, Youngstown, Ohio

[21] Appl. No.: 921,281

[22] Filed: Jul. 3, 1978

[51] Int. Cl.[2] ............... G01P 3/48; G04F 8/00; G07C 3/02

[52] U.S. Cl. .................. 324/166; 364/565; 58/146; 58/152 E

[58] Field of Search ............ 324/160, 166, 168, 169, 324/173-178; 364/565; 361/236, 240, 242; 340/670; 58/145 R, 146, 152 E; 235/92 TF

[56] References Cited

U.S. PATENT DOCUMENTS

| | | | |
|---|---|---|---|
| 3,636,545 | 1/1972 | Boyd et al. | 364/565 |
| 3,748,580 | 7/1973 | Stevens et al. | 324/174 |
| 3,965,669 | 6/1976 | Larson et al. | 58/146 |
| 4,056,778 | 11/1977 | Randazzo | 324/166 |

*Primary Examiner*—Robert J. Corcoran

*Attorney, Agent, or Firm*—Webb, Burden, Robinson & Webb

[57] ABSTRACT

A digital hourmeter-tachometer for use with internal combustion engines or the like comprises a programmable timer for outputting system timing pulses when a d.c. power source is applied thereto. A pick-up pulse circuit generates pulses indicative of the angular speed of the device being monitored and outputs d.c. power to the remainder of the hourmeter-tachometer. A first multiple decade counter counts hour pulses outputted by the timer. A second multiple decade counter counts pulses indicative of angular speed. Display means sequentially display the output of the stored count in the first and second multiple decade counters in response to system timing pulses. A long-life battery applies a direct current to the first counter when the pulses are not received by the pick-up circuit for providing a d.c. source thereby holding the hour count. Preferably, an overspeed shut-down circuit is integrated with the above described circuit.

7 Claims, 5 Drawing Figures

HOURMETER-TACHOMETER

This invention relates to a digital hourmeter-tachometer useful for monitoring a remotely located internal combustion engine or the like. Preferably, the hourmeter-tachometer is combined with an integrated overspeed shut-down. Digital devices for monitoring engine speed and for providing overspeed shut-down have been disclosed in the patent literature (see, for example, U.S. Pat. Nos. 3,835,382; 3,818,342 and 3,572,302). These are not suitable, however, for remote operations.

It is an advantage according to this invention that a device draws very low current under all operating conditions thereby enabling the powering from the pick-up pulses from the engine being monitored and a small long-life battery.

It is a further advantage of this invention that a single bank of seven segment LCD displays sequentially display the hours and the angular speed (rpm) of the engine being monitored.

It is yet another advantage of this invention that it can be easily adapted to operate from the ignition timing pulses of various engines (two-cyle, four-cycle; 1, 2, 3, 4, 6, 8 and 12 cylinders, for example). It may also be easily adapted to operate from pick-up pulses generated as flywheel or gear teeth pass a magnetic pick-up pulse generator where the flywheel or gear contains 10, 15, 20, 30, 40 or 60 teeth, for example.

SUMMARY OF THE INVENTION

Briefly according to this invention, a digital hourmeter-tachometer for use with an internal combustion engine at a remote location is provided. The circuit comprises a programmable timer including a fixed frequency oscillator and divider circuits for outputting system timing pulses. The programmable timer is powered by a d.c. power source which only outputs power during the time when the engine is operating. Therefore the programmable timer only outputs signals during engine operation. A pick-up pulse circuit is arranged to receive a pulse the frequency of which is indicative of the angular speed of the engine. The pick-up pulse circuit also filters the pick-up pulses to provide the d.c. output for powering the remainder of the digital hourmeter-tachometer during the time when the internal combustion engine is operating. An hourmeter comprises a multiple decade counter for counting system timing pulses having a frequency of one per hour. A tachometer comprises a multiple decade counter for counting the speed signal output of the pick-up pulse circuit during a timer period controlled by the system timing pulses. Where the pick-up pulse is derived from the ignition sparking pulse, this time period must be programmed (a) according to the type of engine; that is two strokes per cycle or four strokes per cycle, (b) the number of cylinders of the internal combustion engine and (c) a system multiplication factor. The following table displays the counting period required for several types of engines where the system multiplication factor is ten.

TABLE

| No. of Cylinders | | Tachometer Counting |
|---|---|---|
| 2-cycle | 4-cycle | Period (Seconds) |
| 1 | 1 or 2 | 6 |
|  | 3 | 4 |
| 2 | 4 | 3 |

TABLE-continued

| No. of Cylinders | | Tachometer Counting |
|---|---|---|
| 2-cycle | 4-cycle | Period (Seconds) |
| 3 | 6 | 2 |
| 4 | 8 | 1.5 |
| 6 | 12 | 1 |

Multiplex display means sequentially display the output of the stored count on the tachometer and the hourmeter multiple decade counters in response to system timing pulses. A battery applies direct current to the counters associated with the hourmeter function when pulses are not received at the pick-up circuit thereby enabling the hour count to be held.

Preferably, a shut-down circuit is integrated with the above described hourmeter-tachometer. According to one embodiment, the shut-down circuit comprises a counter for counting the pulsed output of the pick-up circuit during a period controlled by system timing pulses and outputting a shut-down signal if the count exceeds a preselected limit. According to yet another embodiment, the count on the data bus as the tachometer output is being strobed to the display is sequentially decoded for the desired upper speed limit. The decoding circuit outputs a shut-down signal if the speed exceeds a preselected limit. Typically, the shut-down signal is applied to a gate of a shut-down SCR which grounds the ignition circuit from being gated.

DETAILED DESCRIPTION

Figure 1:
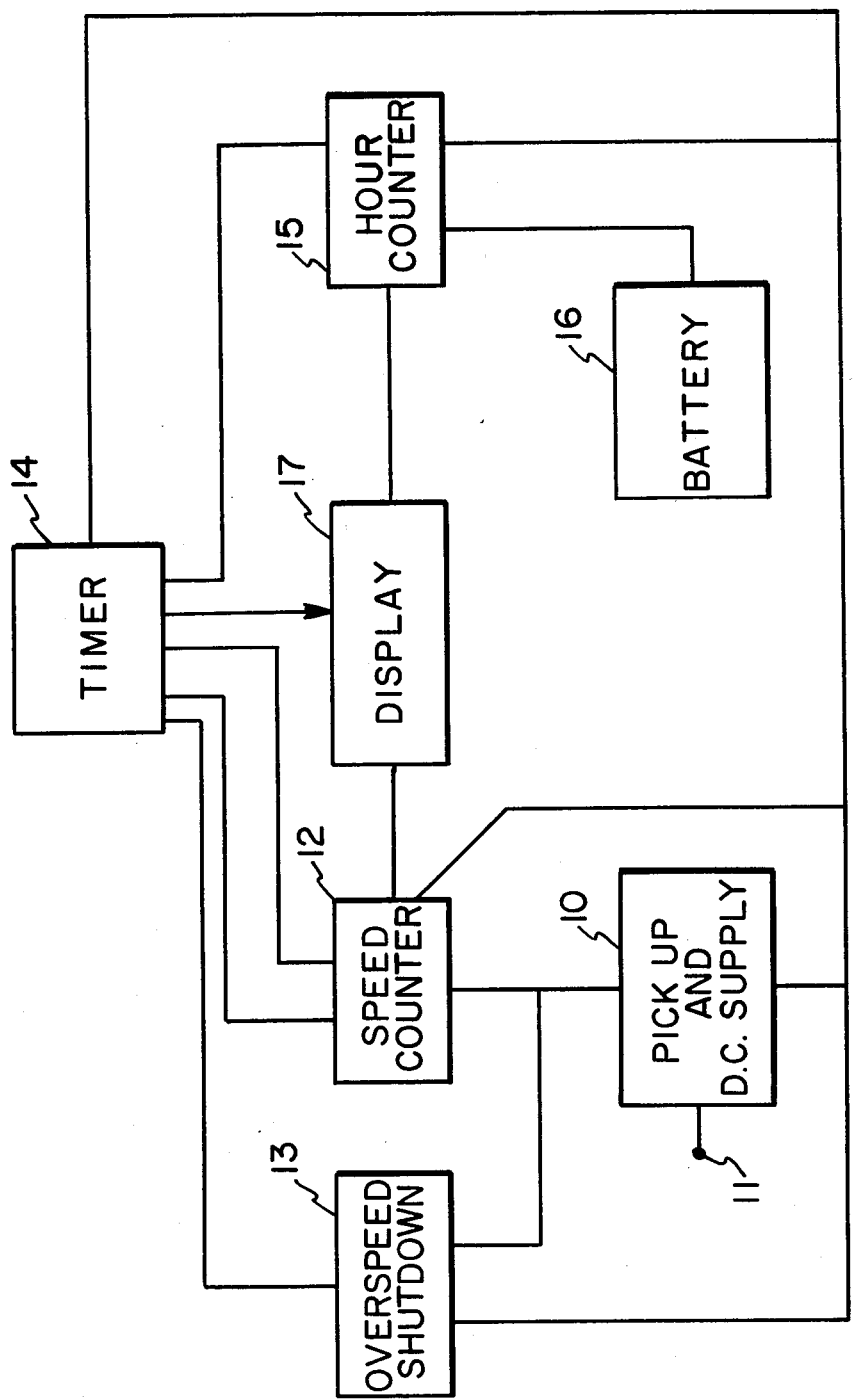
Figure 2:
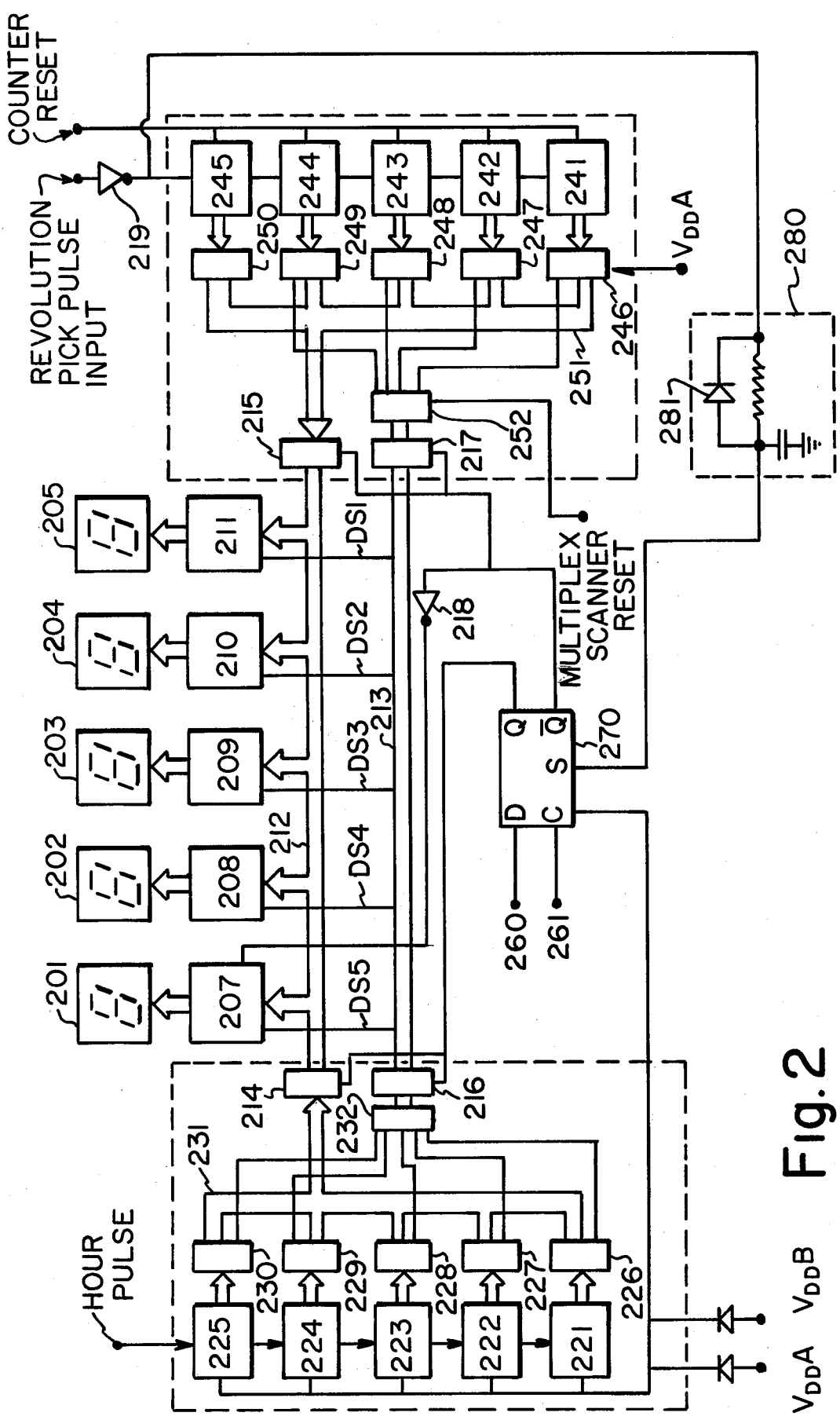
Figure 3:
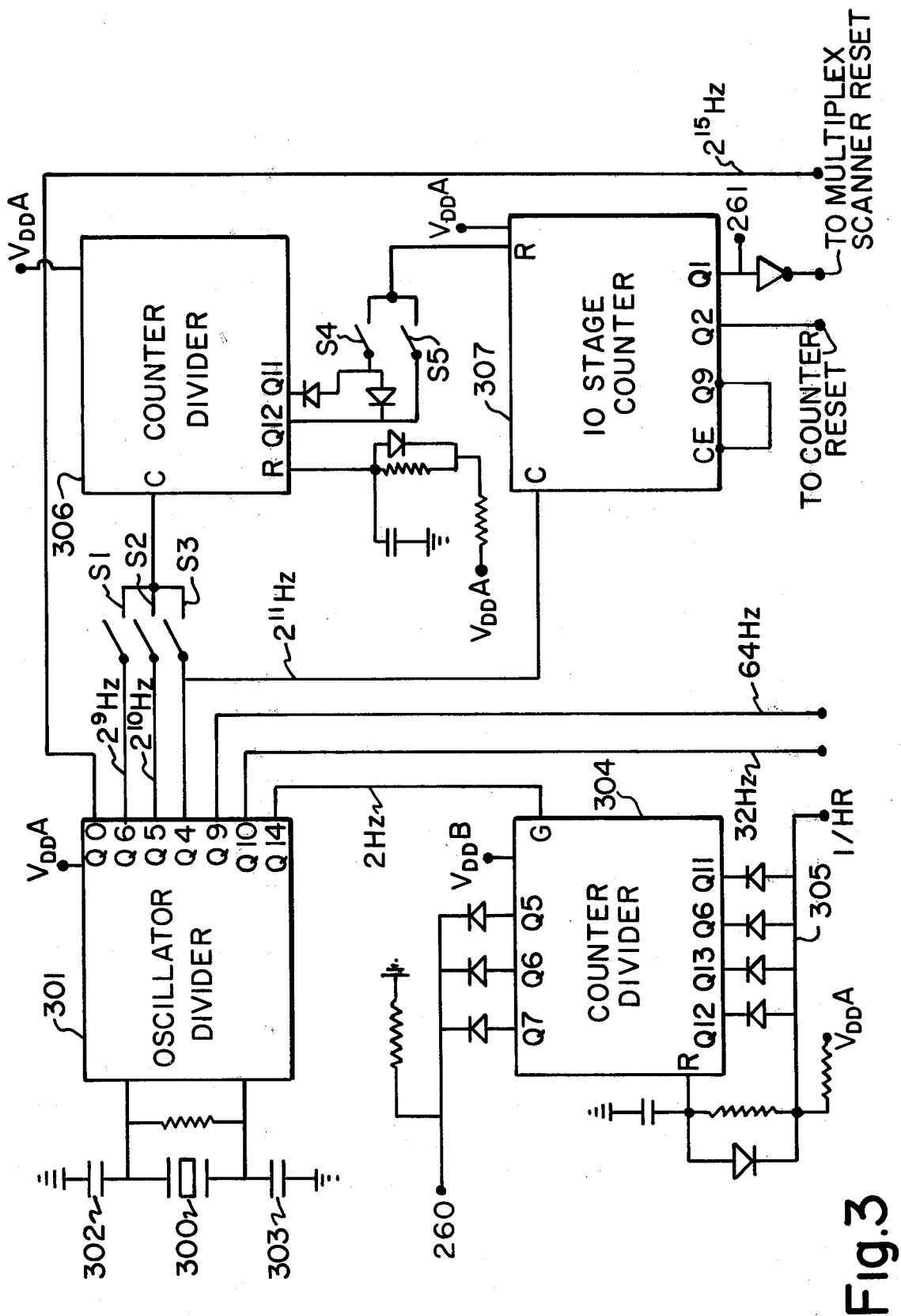
Figure 4:
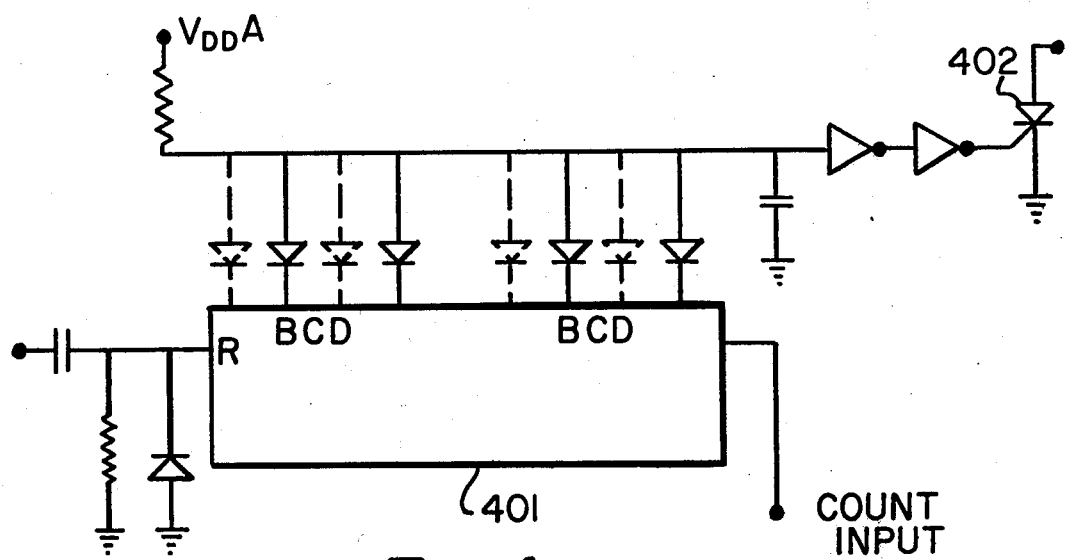
Figure 5:
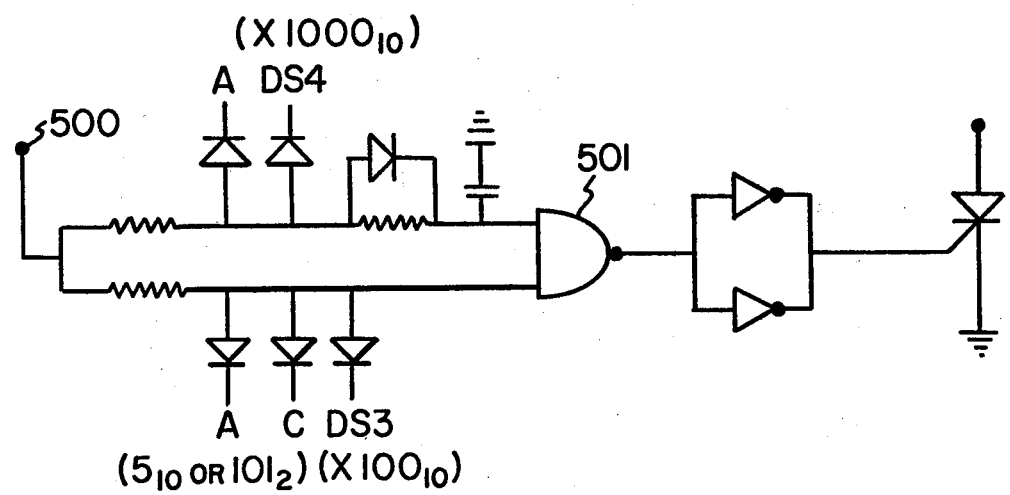

Further features and other objects and advantages of this invention will become clear from the following detailed description made with reference to the drawings, in which FIG. 1 is an overall block diagram of the hourmeter-tachometer according to this invention, FIG. 2 is a detailed circuit diagram illustrating the revolution counter, hour counter and display sections according to this invention, FIG. 3 is a detailed circuit diagram illustrating the timer circuit according to one embodiment of this invention, FIG. 4 illustrates an overspeed shut-down circuit according to this invention, and FIG. 5 shows an alternate overspeed shut-down circuit according to this invention.

Referring now to FIG. 1 there is shown in block diagram form, the arrangement and functional interconnection of the various sections of the hourmeter-tachometer. A pick-up and d.c. supply section 10 receives a pulsed signal indicative of the angular speed of the engine or other device being monitored at the input terminal 11. The pulsed signal is processed into a suitable digital pulse and outputted to the speed counter section 12 and to the overspeed shut-down section 13. (These may be combined as one section in some embodiments.) The pulsed pick-up signal is also filtered to provide the d.c. power source for operating the entire hourmeter-tachometer circuit during the operation of the device being monitored. The d.c. power supply is connected to all other sections.

A timer section 14 contains an oscillator and counter divider circuits to produce clock pulses for the hour counter section 15, a display mode pulse for selecting whether hours or angular speed (rpms) are displayed, start and stop counter pulses for the speed counter 12 and suitable clock pulses for multiplex scanning. Other pulses produced by the timer section are discussed hereafter. The timer section is powered by the d.c. power source 10 only during the time the pick-up pulses are being received. Hence, the clock pulse for advancing the hour counter section can only be generated during engine operation. The hour counter section 15 has a battery power supply 16 which enables the digital counters therein to hold the count during long periods of time when the engine is not being operated.

The display section 17 is a double multiplex digital displaying system for displaying either the hour count or the speed count. It comprises a readout including five seven-segment-LCD-displays. Liquid crystal displays (LCD) have the advantage of requiring extremely low operating current.

The overspeed shut-down 13 may comprise a separate counter for counting pick-up pulses. In that instance, it is programmable to preset the speed limit by designating a number of counts which, if exceeded, result in the output of a shut-down signal. The shut-down signal may, for example, be applied to the gate of an SCR which can then cause the grounding of the ignition spark pulse or interruption of the fuel supply or both.

Referring now to FIG. 2, the hour counter, speed counter and display sections are illustrated. Five seven-segmented-LCD-displays 201 to 205 are each driven by BCD-to-seven-segment driver display latches 207 to 211. Suitable display driver ICs comprise the Motorola MC14543. The BCD inputs to the driver displays are all connected to a common data bus 212. The data bus comprises four binary digit lines A, B, C and D, with line A being assigned the least significant bit. Each display driver has a latch or enable connection to an address bus 213. The address bus comprises five digit select lines DS1, DS2, DS3, DS4 and DS5. The data bus 212 has three-state logic buffers 214 and 215 at each end. Also, the address bus 213 has three-state buffers 216 and 217 at each end. Buffers 215 and 217 have connected disabling inputs as do buffers 214 and 216. Each buffer is placed in its high impedance state by a high on its disable input. In operation, the signal applied to disable inputs of buffers 214 and 216 is inverted from the signal applied to the disable inputs of buffers 215 and 217 by flip-flop 270. Thus one and only one set of data is applied to common buses 212 and 213 at any instant. Timing signals 260 and 261 applied to flip-flop 270 determine which set of buffers are enabled. Note that the signal also applied to buffers 215 and 217 is applied through inverter 218 to the blanking input of IC 207. A logic high accomplishes blanking. Hence, whenever buffers 215 and 217 are enabled by a low on their disable input, a high is applied to the blanking input of IC 207 causing display 201 to be blanked. The blanking of display 201 indicates speed is being displayed as explained hereafter.

When the device being monitored is shut-down, network 280 transfers a high from the output of inverter 219 to the Set terminal (s) of IC 270 insuring that it latches into the mode of Q high (open-circuiting all the outputs of the live hour counter) and $\overline{Q}$ low (the speed counter packages have no power on shutdown). This isolates all live high signals from any input or output of the IC's powered solely from $V_{DD}A$. This is important from the standpoint of minimizing battery drain and from preventing a d.c. signal from being applied to the LCD which greatly reduces its life expectancy. The time delay circuit (about one second time constant) insures that the pulsating signal from the output of inverter 219 during normal operation never is able to apply a high to the S terminal of IC 270. Diode 281 discharges the capacitor as soon as a low appears at its cathode.

The hour counter comprises five decade counters 221 to 225 cascaded together. The BCD output of each counter is applied to a multiplex buffer 226 to 230 and then to common BCD bus 231. Multiplex scanner 232 when enabled sequentially strobes the count of each counter 221 to 225 onto the BCD bus 231 by sequentially enabling buffers 226 through 230. At the same time, display drivers 207 to 211 are respectively enabled by sequential signals on digit select lines DS1 to DS5. Thus, for example, when buffers 214 and 216 are enabled and multiplex scanning is initiated the ten-thousands count on counter 221 is applied to display driver 207 and display 201 because a signal on digit select line DS5 is applied to the enabling or latch pin of driver IC 207. The hours count up to 99,999 and this count is displayed. Note that the cascaded decade counters 221 through 225 are powered from the battery power supply $V_{DD}B$ as well as the d.c. power supply $V_{DD}A$. Thus the count is preserved when the monitored device is not operating and the d.c. power supply is inactive. The elements 214, 216 and 221 through 232 (enclosed in the dashed line) are available as a single IC, for example, Motorola's real time five decade counter MC14534B.

The speed counter works in the same general way as the hour counter. It comprises decade counters 241 through 245, multiplex buffers 246 through 250, BCD data bus 251 and multiplex scanner 252. The output of the speed (actually revolution) counter is arranged to readout in 10 rpm increments; hence, when the multiplex scanner 252 is reset, the outputs of counters 245, 244 and 243 are strobed to display drivers 210, 209 and 208 respectively. (Recall that display driver 207 is blank at this time). The count never reaches the fourth or fifth decade. Hence, the zero count on counter 242 is applied to display driver 211. By displaying the units counter 245 count in the ten's display 204, etc. the system multiplication factor is ten.

Referring now to FIG. 3, there is illustrated the timing circuit or timer of the hourmeter-tachometer. The timing circuit comprises an oscillator or time base from which all timing signals are derived. In the embodiment illustrated, a crystal oscillator is shown. However, other oscillators could be used. The crystal oscillator comprises crystal 300, oscillator divider IC 301 and associated capacitors 302 and 303. In this case, a 32.768 kilohertz ($2^{15}$ hertz) crystal was selected. High frequency crystals are inexpensive and yield good overall stability. IC 301, in addition to carrying the amplifier element of the oscillator also carries the digital counter divider network with outputs Q0, Q4–Q10 and Q12–Q14. Output Q4, for example, has a frequency equal to the input frequency divided by $2^4$ or in this case, 2048 hertz. There are a number of suitable oscillator divider ICs available commercially. The particular IC used in the embodiment built, tested and described herein, was an RCA CD4060. IC 301 is powered from $V_{DD}A$, that is, the power supply which outputs only when pick-up pulses are being received. Hence, IC 301 outputs timing signals only during operation of the engine being monitored.

The two hertz signal on output Q14 of IC 301 is used to drive or clock IC 304 which is a counter divider circuit. IC 304 is a typical ripple counter having a plurality of divided down outputs and here has, at least divided down outputs Q6, Q11, Q12 and Q13. These outputs are decoded by the diode network connected to output line 305. In other words, 7,200 counts (3600 seconds) after reset, the outputs Q6, Q11, Q12 and Q13 are all high allowing the line 305 to go high. Thus line 305 goes high once per hour. The high on line 305 is applied to the counter reset input (R) restarting the count.

Counter divider IC 306 in cooperation with counter divider 301 and switches S1 through S5 determine the reset period of the tachometer. One and only one of switches S1, S2 and S3 is closed. One and only one of switches S4 and S5 is closed. With one of switches S1, S2 and S3 exclusively closed, the input to IC 306 will be $2^9$, $2^{10}$ or $2^{11}$ hertz respectively. With the switch S4 closed, the two diode decoding network and IC 306 divides by 3,072. With S5 closed, the input to IC 306 is divided by 2,048. (The output of Q12 has a frequency of $2^{-12} \times$ the input frequency. However, since the output is returned to the reset, the high half of the output waveform is not used. Hence, the output of Q12 goes high for an instant after IC 306 has received $2^{11}$ input pulses.)

The output of the switches S4 or S5 is applied to the reset pin (R) of IC 307. This output establishes the up-date time used by the tachometer.

The following tables illustrate the way switches S1 through S5 should be connected for various ignition powered tachometers and various flywheel or gear tooth operated tachometers.

Ignition Powered (10 RPM increment for tachometer)

| No. of Cylinders | | | |
|---|---|---|---|
| 2-cycle | 4-cycle | Switches ON | Up-Date Time |
| 1 | 1 or 2 | 4,1 | 6.0 secs. |
| — | 3 | 5,1 | 4.0 secs. |
| 2 | 4 | 4,2 | 3.0 secs. |
| 3 | 6 | 5,2 | 2.0 secs. |
| 4 | 8 | 4,3 | 1.5 secs. |
| 6 | 12 | 5,3 | 1.0 secs. |

Pick-up Powered (1 RPM increment for tachometer)

| No. of teeth on gear, flywheel, etc. | SWITCHES ON | Up-Date Time |
|---|---|---|
| 10 | 4,1 | 6.0 secs. |
| 15 | 5,1 | 4.0 secs. |
| 20 | 4,2 | 3.0 secs. |
| 30 | 5,2 | 2.0 secs. |
| 40 | 4,3 | 1.5 secs. |
| 60 | 5,3 | 1.0 secs. |

These times are easily calculated and easily calculated and other time periods can be arranged by the manner in which the outputs of the IC 301 and IC 306 are used.

IC 307 is simply a 10-stage counter. The clock input is a $2^{11}$ hertz signal from the oscillator divider IC 301. As explained, the up-date timer signal is applied to the reset of counter 307. When the reset (R) of 10-stage counter 307 goes high, all stages of the IC reset. When reset then goes low, IC 307 begins counting through its output stages first outputting a high pulse on Q1 which is inverted thus applying a low to the scanner reset. This results in a multiplex readout of the speed count. When counter 307 advances to the next stage, Q1 goes low and Q2 goes high. The low from Q1 is inverted thus applying a high to the scanner reset (see FIG. 2, block 252) which disables the scanner and latches all display drivers at the just registered count. The high pulse from Q2 is applied to the reset terminal of the multiplexing counter re-setting all stages (see FIG. 2, blocks 241 to 245) to zero. As soon as Q2 goes low, counting of speed indicative pulses commences for the next up-date period. Counter 307 proceeds through the rest of its output stages until Q9 is reached. The high from Q9 is used to disable the clock of IC 307. Thus counter 307 holds at Q9 until the next high appears at its reset (R) which starts the whole cycle over.

The 64 hertz output of the IC 301 is used for driving the LCD display. The 32 hertz output of IC 301 is used for clocking the scanner of the hour counter. The $2^{15}$ hertz output of IC 301 is used to clock the scanner of the speed counter.

Diodes connected to outputs Q5, Q6 and Q7 of counter 304 provide a signal with a 64 second time base at terminal 260 which is high for 56 seconds and low for 8 seconds. This is applied to the data (D) input of flip-flop 270. The signal from Q1 of counter 307 is applied to terminal 261—the clock (C) input of flip-flop 270. When terminal 261 goes high, the data (D) is strobed through IC 270 to output Q. $\bar{Q}$ is the inverse of Q. Thus the transistion from hours to speed (and the reverse) takes place as the tachometer reading is up-dated. This insures that at the instant the fifth digit is blanked, speed will be displayed. The signal at terminal 260 must remain low at least as long as the longest tachometer up-date period—in this embodiment, 6 seconds.

In a preferred embodiment, the overspeed shut-down may simply comprise a decoded dual BCD counter as illustrated in FIG. 4. A timing pulse (1 or 2 hertz square wave) from the timer is applied to a differentiation network comprising a capacitor, resistor and diode. The differentiated output is applied to the reset of IC 401. The positive going edge of the square wave thus resets the counter which can hold a count up to 99 decimal. The overspeed signal is obtained by counting pick-up pulses in IC 401 for a fixed period of time as determined by the input to the reset. The timer period may be, for example 1 second. The count is decoded by connecting diodes as shown to the BCD outputs of IC 401 representing the given count. If that number is reached before the counter is reset, all output lines go high resulting in an output pulse. The output pulse triggers the shut-down SCR. The capacitor and inverters between IC 401 and SCR 402 are for pulse shaping. The output count of IC 401 selected for overspeed shut-down for given speed is easily calculated. For example, a one cylinder engine will produce a number of pulses equal to rpm over 60 in one second. Thus, if 420 rpm is the desired overspeed shut-down, diodes are connected to BCD lines adding to 7 decimal (111 BCD). Similarly, a 10 cylinder, two-cycle engine with a desired shut-down rpm of 330 produces 55 pulses in one second. Diodes connected to BCD lines adding to 55 decimal would be selected.

An alternate overspeed control is illustrated in FIG. 5. The input 500 is connected to a logic high only when the speed count is being strobed on the BCD bus 212. The network leading to the upper input to the Nand gate 501 decodes the BCD signal indicative of the thousands digit being strobed to display driver 208. If, for example, the speed limit is 1500 rpm, only the line corresponding to the lowest binary place (A) of the BCD output for the thousands need be decoded. If, when the thousands counter is applied to the data bus (when digit select line DS4 is high) the lowest binary line has a high, then the speed has reached at least 1000 rpm. The high signal is applied to the diode-resistor-capacitor network which delays it at the upper input to the Nand gate 501. The first (A) and third (C) binary outputs of the BCD bus are decoded when the hundreds counter is being applied to IC 209 (when digit select line DS3 is high). When lines A and C go high, the binary number on the BCD bus is at least 101 binary or 5 decimal and a high is applied to the lower input to Nand 501. When both inputs to Nand gate 501 go high, the speed has reached 1500 rpms and the output (subsequently inverted) and applied to the gate of the shut-down SCR will gate the SCR to ground the ignition circuit.

OPERATION

The crystal oscillator 301, 302, 303 and 300 provides an accurate time base, in this case, $2^{15}$ hertz. Counters divide this frequency to much slower rates which are then used to give time intervals to various functions. For example, one second time intervals for counting the ignition pulses (used by the tachomoter), one hour time pulses for counting hours (used by the hourmeter) and 64 second pulses for switching functions (hours are flashed once every 64 seconds).

Two five decade counters count pulses and output each decade separately on common BCD lines by multiplexing. Five digits select outputs are used to address the decade being selected. Three state buffers isolate one or the other five decade counters from the BCD data and address buses. This feature allows the two counters to be wired in common with one data bus and one address bus. In the embodiment described, the speed counter outputs to the display drivers most of the time. Only every 64 seconds are the hours displayed for a period of about eight seconds. The mode select circuit assures that only one of the counters can provide output to the data and address buses at any given instance. If desired, a push-button could be provided for reading hours instead of the time sequence above described.

The hourmeter operates basically as follows: Pulses divided down to one hour are fed to the clock input of the five decade counter assigned to count hours, as long as power from the ignition system is available. The counter thereby keeps track of hours of engine operation. The five digit select lines in the address bus are connected to the five drivers in a right-to-left sequence. During readout each driver is activated one-fifth of the time and latched four-fifths of the time. The hour count is thereby displayed. Small long-life batteries (lithium-type with a life of up to 25 years) maintain power on the hourmeter counting packages so that the hour count is retained even when the engine is shut-down.

The tachometer operation is generally as follows: Assume a six-cylinder, two-cycle engine and a one second up-date period; ignition pulses are counted for one second with a number equalling rpm divided by 10 (620 rpm gives 62 pulses in one second). This may be understood as follows. The rpm equals the number of pulses counted in a minute divided, for 2-cycle only, by the number of cylinders. For six-cylinders, the rpm equals the number of pulses counted in 10 seconds. If the counting period is only 1 second, the count must be multiplied by 10 in order to give the correct rpm.

After one second during which pulses are counted, the logic circuitry allows the scan of the five decade counters as the digit select outputs go high. The drivers are unlatched momentarily allowing the new count to be entered. After an interval of 488 microseconds during which 16 digits are scanned (3-1/5 complete cycles) the logic circuitry once again disables the scanner and provides the 488 microsecond reset signal to the decade counter. The counting cycle then repeats.

The interconnection of the counters to the address bus and drivers is as follows:

| Digit | Hourmeter Counter | Tachometer Counter |
|---|---|---|
| Units (DS1) | 225 | 242 |
| Tens (DS2) | 224 | 245 |
| Hundreds (DS3) | 223 | 244 |
| Thousands (DS4) | 222 | 243 |
| Ten-thousands (DS5) | 221 | (Blanked) |

The tachometer is arranged to readout in 10 rpm increments. In other words, each pulse applied to the unit counter 245 is equivalent to 10 rpm. Therefore, counter 245 of the tachometer drives the tens digit driver providing the system multiplication factor of ten. Since there are never enough pulses counted to get into the fourth decade, the BCD output of the fourth decade counter is always zero. It is convenient to use this output to provide a zero on the units readout. Hence, counter 242 of the tachometer is arranged to drive the decoder driver 211.

Flip-flop 270 has opposite outputs Q and $\overline{Q}$ which alternately disable one 5-decade counter and then the other. When the tachometer count is displayed, a high is imposed on the blanking input of the fifth digit driver. Therefore, when the operator sees four digits on the display he is aware that rpm is being displayed. When an operator sees five digits including zeros on the left, he is aware that hours are being displayed.

Having thus defined my invention with the detail and particularity required by the Patent Laws, what is desired protected by Letters Patent is set forth in the following claims.

We claim:

1. An electronic, digital hourmeter-tachometer for use with internal combustion engines or the like comprising:
   (a) a programmable timer comprising fixed frequency oscillator and divider circuits for outputting system timing pulses when a d.c. power is applied thereto;
   (b) a pulse pick-up circuit comprising means for receiving a pulse, the frequency of which is indicative of the rpm of the engine and for outputting a pulsed signal having a frequency related to said received signal and means for filtering the pick-up pulses to provide a d.c. output for powering the remainder of the digital hourmeter-tachometer;
   (c) an electronic hour counter comprising digital counters for counting system timing pulses;
   (d) a speed counter for counting the pulsed signal output of the pick-up circuit during an update period controlled by the system timing pulses;
   (e) common display means for sequentially displaying the output of the stored count in the hour counter and the speed counter in response to system timing pulses;
   (f) means for connecting the d.c. output of the pulse pick-up circuit to power the said programmable timer, hour counter, speed counter, and common display when the pick-up pulses are applied to the pick-up circuit; and
   (g) battery means for applying a d.c. current to the hour counter when pick-up pulses are not supplied to the pulse pick-up circuit thereby holding the hour count.

2. A digital hourmeter-tachometer according to claim 1 further comprising a shut-down circuit comprising:
   a counter for counting the pulsed signal output of the pick-up circuit for a time period controlled by the system timing pulses and outputting a shut-down signal to the engine if the count exceeds a preselected limit.

3. The digital hour-tachometer according to claim 1 further comprising means for differrentiating between the two display counts by blanking one or more digits of the display while the speed count is displayed.

4. The digital hourmeter-tachometer according to claim 3 further comprising an IC flip-flop means for insuring display of the speed count commences simultaneously with the completion of a said update period.

5. The digital hourmeter-tachometer according to claim 1 further comprising an IC flip-flop means and wherein the battery only powers the hour counter and said IC flip-flop means, and the hour counter and IC flip-flop means are the only active circuits when pick-up pulses are not supplied to the pick-up pulse circuit and said IC flip-flop means being provided to output a signal placing all buffered outputs of the hour counter in a high impedance state such that no live digital signal can be applied to any portion of the circuit not powered by the battery.

6. The digital hourmeter-tachometer according to claim 5 further comprising a time delay circuit means connected to an inverter output, the input of which is connected to the pulsed signal output of the pick-up pulse circuit, for switching the said IC flip-flop means to output said signal shortly after cessation of the pulsed signal output.

7. A digital hourmeter-tachometer for use with internal combustion engines or the like comprising:
   (a) a programmable timer comprising fixed frequency oscillator and divider circuits for outputting system timing pulses when a d.c. power is applied thereto;
   (b) a pulse pick-up circuit comprising means for receiving a pulse, the frequency of which is indicative of the rpm of the engine and for outputting a pulsed signal having a frequency related to said received signal and means for filtering the pick-up pulses to provide a d.c. output for powering the remainder of the digital hourmeter-tachometer;
   (c) an hour counter comprising a plurality of cascaded BCD digital counters for counting system timing pulses and a plurality of buffers;
   (d) a speed counter comprising a plurality of cascaded BCD digital counters for counting the pulsed signal output of the pick-up circuit during an update period controlled by the system timing pulses and a plurality of buffers;
   (e) common display means comprising a plurality of BCD to seven segment drivers and a corresponding plurality of seven segment LCD displays for sequentially displaying the output of the stored count in the hour counter and the speed counter in response to system timing pulses;
   (f) a BCD bus connected to each BCD digital counter of the hour counter and each BCD digital counter of the speed counter through said plurality of buffers and said BCD bus also connected to each seven segment driver of the common display means;
   (g) an address bus connected to the said plurality of buffers and latch enable terminals of each seven segment driver of the common display means;
   (h) multiplexing means connected to said address bus for controlling the transfer of the count in each BCD digital counter to the display means;
   (i) a flip-flop means responsive to signals from the programmable timer, said flip-flop for outputting signals to permit either the hour counter or the speed counter access to the address and data buses,
   (j) means for connecting the d.c. output of the pulse pick-up circuit to power the said timer, hour counter, speed counter and common display circuits when the pick-up pulses are applied to the pick-up circuit; and
   (k) battery means for applying a d.c. output to the hourmeter when pick-up pulses are not supplied to the pulse pick-up circuit thereby holding the hour count.

* * * * *